United States Patent [19]

Fushimi et al.

[11] 4,210,944

[45] Jul. 1, 1980

[54] TAPE STOP DETECTION MECHANISM FOR CASSETTE TAPE RECORDERS

[75] Inventors: Akihiro Fushimi; Noboru Tabara; Mikio Isaki, all of Kawagoe, Japan

[73] Assignee: Pioneer Electronic Corporation, Tokyo, Japan

[21] Appl. No.: 8,287

[22] Filed: Jan. 31, 1979

[30] Foreign Application Priority Data

Jan. 31, 1978 [JP] Japan .................................... 53-8789

[51] Int. Cl.² ....................... G11B 15/22; B65H 59/38
[52] U.S. Cl. ..................................... 360/74.2; 242/191
[58] Field of Search ........................ 360/74.2; 242/191

[56] References Cited

U.S. PATENT DOCUMENTS

| 3,604,714 | 9/1971 | Staar | 360/74.2 |
| 4,118,744 | 10/1978 | Sato | 360/74.2 |

Primary Examiner—Robert S. Tupper
Attorney, Agent, or Firm—Armstrong, Nikaido, Marmelstein & Kubovcik

[57] ABSTRACT

A tape stop detection mechanism for cassette tape recorders is disclosed. The tape recorder includes two reel bases driven by a suitable drive and two reel shafts mounted in a usual slip-drive manner on the reel bases. Two slip plates are provided about the reel shafts so as to be displaced upon rotation of the reel shafts, a detection lever is connected at either end with said slip plates so that the lever is also displaced when at least one of the reel shafts is rotated, and cam means is provided which cooperates with the detection lever only when the lever is restored as a result of stoppage of the reel shafts. In response to the cooperation of the cam means with the detection lever, the rotation of the reel bases is interrupted or the rotating direction of a given reel base is reversed.

6 Claims, 12 Drawing Figures

TAPE STOP DETECTION MECHANISM FOR CASSETTE TAPE RECORDERS

BACKGROUND OF THE INVENTION

This invention relates to cassette tape recorders, and more particularly, to a mechanism for detecting the stoppage of tape run in a cassette tape recorder.

Cassette tape recorders have two reel bases driven by a motor via a suitable transmission. A reel shaft is mounted in a slip-drive manner on each reel base so that the reel shaft is normally rotated with the reel base, but stopped with the reel base idling when tape run is stopped.

SUMMARY OF THE INVENTION

This invention provides a tape stop detection mechanism suitable for use in cassette tape recorders of the above-mentioned type. A slip plate is provided in association with each reel base, preferably mounted about each reel shaft so that it is displaced when the reel shaft rotates. A detection lever is connected at either end with the slip plates. This detection lever is also displaced by way of the slip plates when at least one reel shaft rotates. Cam means includes a cam disc and a cam follower. The cam means is free from the detection lever when the lever is displaced, but cooperates with the detection lever when the lever is restored as a result of stoppage of the reel shafts. Means associated with the cam follower is provided for interrupting the drive to the reel bases or changing the drive into another state in response to the cooperation of the cam means with the detection lever. Preferably, the rotation of the reel bases may be interrupted. Alternatively, the rotating direction of a given reel base may be reversed.

BRIEF DESCRIPTION OF THE DRAWINGS

While the specification concludes with claims, it is believed that the invention will be more fully understood from the following description which is given by way of example with the accompanying drawings in which:

DETAILED DESCRIPTION OF PREFERRED EMBODIMENTS

Figure 1:
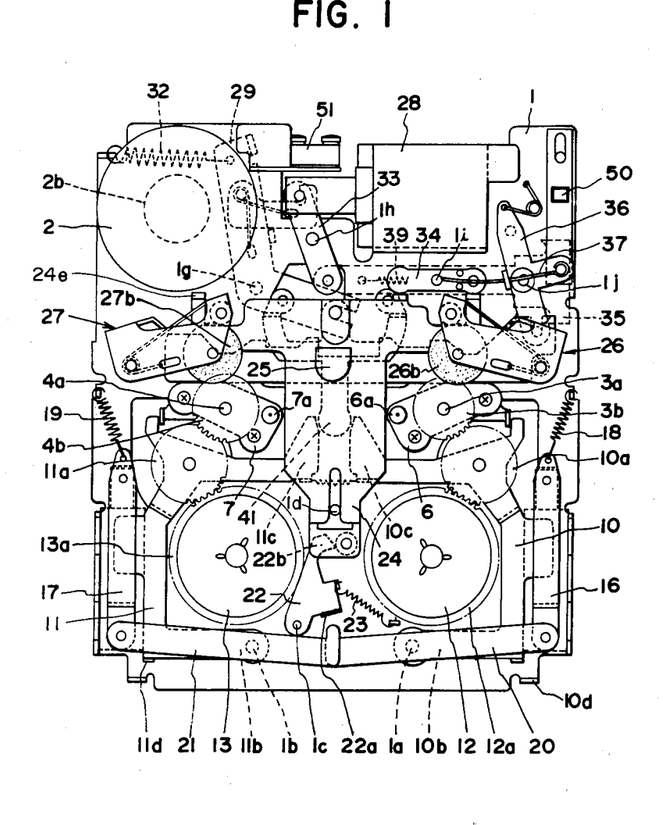
FIG. 1 is a plan view of a tape recorder according to this invention.
Figure 2:
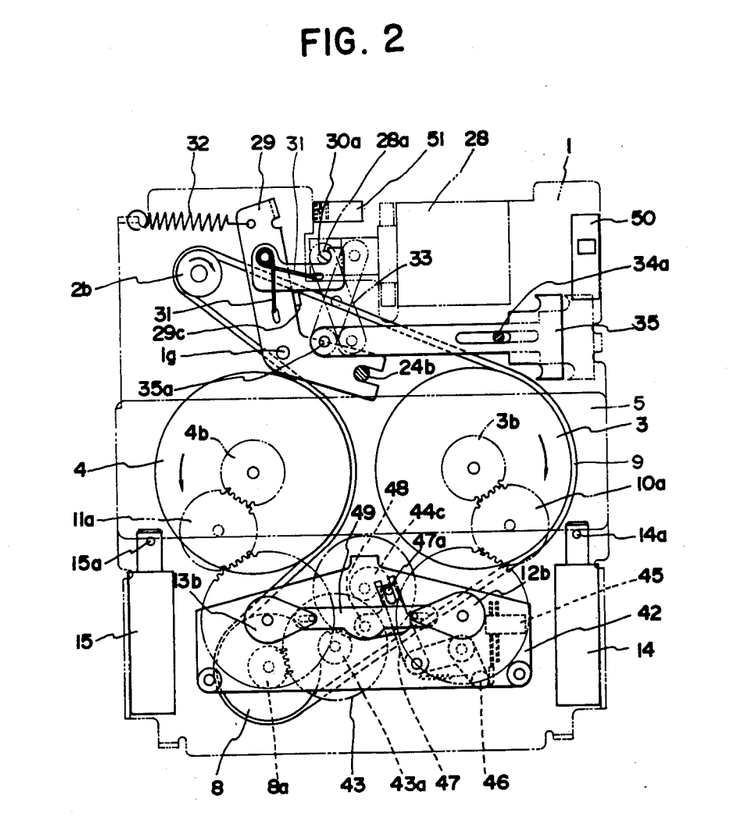
FIG. 2 is a plan view of the tape recorder with its chassis removed.
Figure 3:
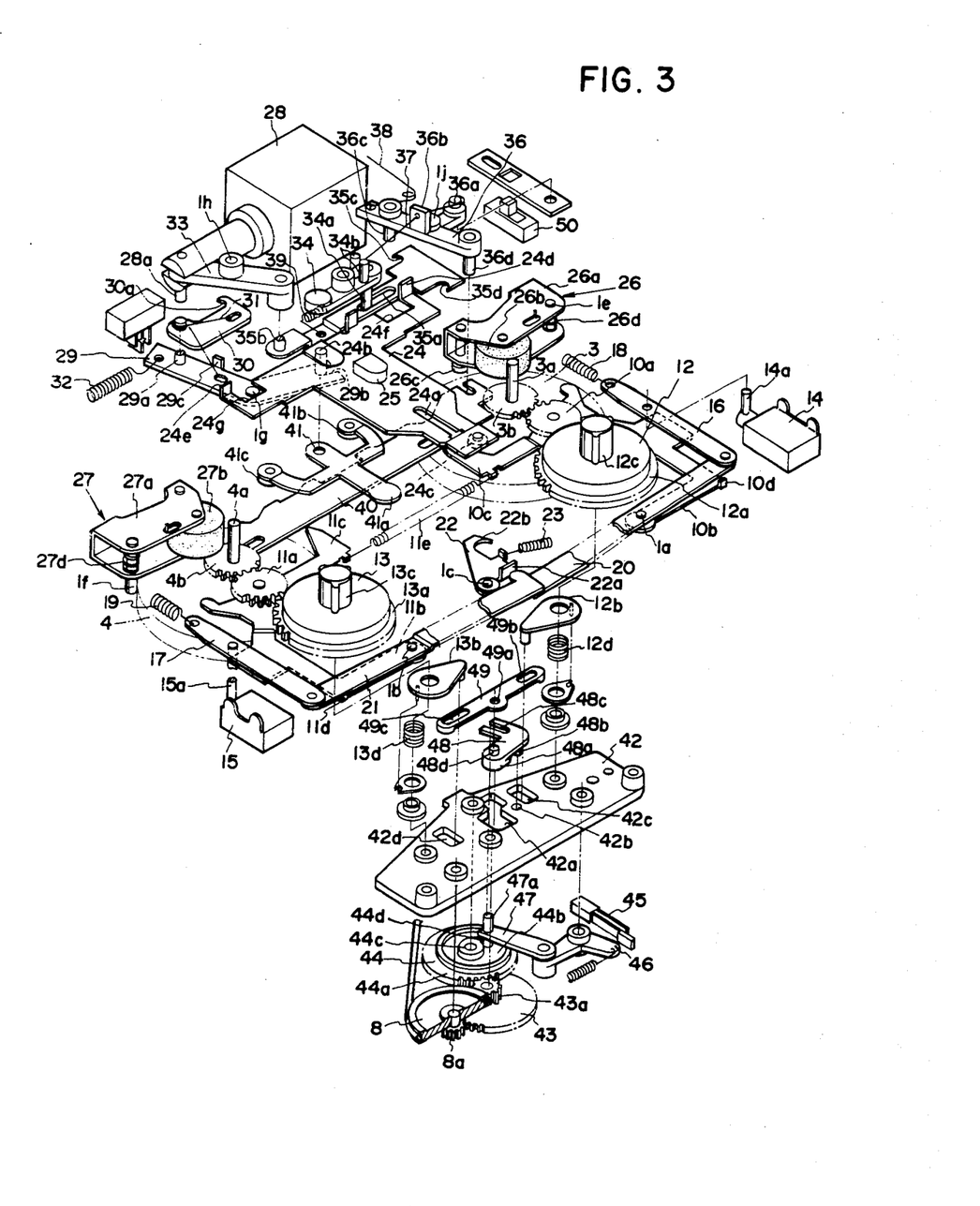
FIG. 3 is a perspective exploded view of the tape recorder.
Figure 4:
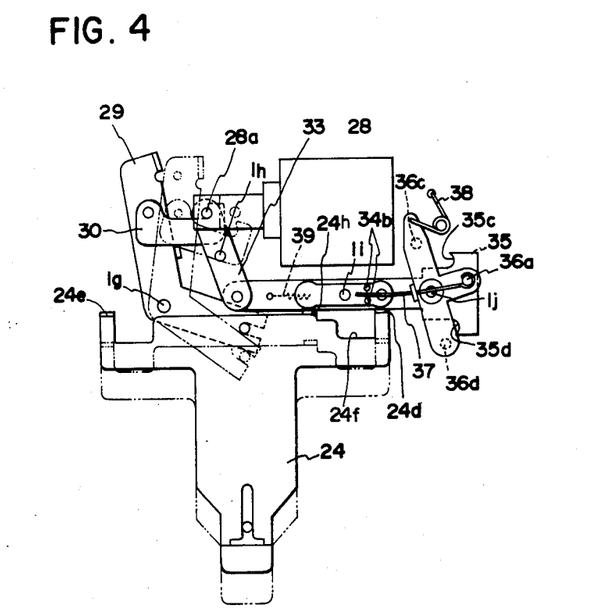
FIG. 4 is a plan view showing a mechanism for advancing a head carriage in a playback state.

Referring to FIGS. 1 to 3, numeral 1 generally designates a chassis on which a motor 2 is fixedly mounted. First and second flywheels 3 and 4 are affixed on rotating shafts 3a and 4a which are at their lower ends journalled in a backing plate 5 attached to the underside of chassis 1 and at their upper ends journalled in supports 6 and 7 bolted to chassis 1. Since the portions of rotating shafts 3a and 4a which project beyond supports 6 and 7 serve as a capstan, rotating shafts 3a and 4a are referred to as capstans hereinafter. Supports 6 and 7 have guide pins 6a and 7a formed integral therewith and perpendicular thereto which are to be inserted into two guide holes in a cassette. Numeral 8 is a pulley rotatably supported in a mounting plate 42 which is secured to chassis 1 for installing a tape stop detecting unit to be described hereinafter. A belt 9 is trained around pulley 8, first and second flywheels 3 and 4, and a pulley 2b fixedly mounted on a rotating shaft 2a of motor 2 as clearly shown in FIG. 2. Motor 2 drives first and second flywheels 3 and 4 and pulley 8 through this belt transmission.

First and second flywheels 3 and 4 are provided with gears 3a and 4a which mesh with idle gears 10a and 11a rotatably mounted on control levers 10 and 11. Idle gears 10a and 11a in turn mesh with gears 12a and 13a associated with first and second reel bases 12 and 13. With this arrangement, both first and second reel bases 12 and 13 rotate in tape take-up directions when first and second flywheels 3 and 4 are rotated in by means of motor 2. Control levers 10 and 11 in the form of a substantially C-shaped lever are at one end pivotally mounted on pins 1a and 1b anchored to chassis 1. The other ends or contact portions 10c and 11c of control levers 10 and 11 are biased toward each other by a spring 11e and disposed in a facing relationship to the opposite edges of a head 41a of a selector arm 41 to be described hereinafter. Idle gears 10a and 11a are located on the control levers near, but spaced apart from contact portions 10c and 11c. Pivotal movement of control levers 10 and 11 about pins 1a and 1b causes idle gears 10a and 11a to travel along the outer periphery of gears 12a and 13a of first and second reel bases 12 and 13 so that the idle gears may be selectively released from gears 3b and 4b of first and second flywheels 3 and 4. Control levers 10 and 11 are further provided with upright tabs 10d and 11d capable of engaging with release levers 20 and 21. The release levers cooperate with upright tabs 10d and 11d to move control levers 10 and 11 so as to release idle gears 10a and 11a from gears 3b and 4b when the release levers are rotated about pins 1a and 1b as described hereinafter.

Numerals 14 and 15 designate plungers secured to the underside of chassis 1 and their rods have pins 14a and 15a which project upward through slots in chassis 1. Interlocking levers 16 and 17 are pivotally mounted on pins 14a and 15a. Springs 18 and 19 are connected to chassis 1 and to each one end of levers 16 and 17. The other ends of levers 16 and 17 are pivotally connected to one ends of release levers 20 and 21. Release levers 20 and 21 are also pivotally mounted substantially at the center on pins 1a and 1b on chassis 1. Numeral 22 designates a lock plate pivotally mounted on a pin 1c on chassis 1. Lock plate 22 has an upright tab 22a engageable with projections at the other ends of release levers 20 and 21 and a jaw 22b engageable with a roller 24c on a head carriage 24. Lock plate 22 is biased clockwise by a spring 23.

Head carriage 24 is formed with a guide groove 24a which receives a pin 1d on chassis 1 and provided with a pin 24b which is received by a guide groove (not shown) in chassis 1. These pins and grooves allow the head carriage to linearly reciprocate. In the drawings, head carriage 24 is shown as having only a playback head 25 thereon while any recording and erasing heads may also be mounted on the carriage if a recording function is required for the tape recorder. Head carriage 24 has at the extremity thereof a roller 24c which may be brought into engagement with jaw 22b of lock plate 22 when head carriage 24 moves forward (down-wards in FIG. 1).

Numerals 26 and 27 designate pinch roller units including support frames 26a and 27a pivotally mounted on pins 1e and 1f on chassis 1. Frames 26a and 27a have pinch rollers 26b and 27b rotatably mounted therein and auxiliary rollers 26c and 27c (FIG. 5) rotatably mounted below the frames. Coil springs 26d and 27d are wound on pins 1e and 1f between opposing walls of frames 26a and 27a. As seen from FIG. 1, one end each of coil springs 26d and 27d abut against upright tabs 24d and 24e formed at the lateral extremities of head carriage 24. Auxiliary rollers 26c and 27c face recesses 24f and 24g in head carriage 24.

Numeral 28 designates a selector plunger fixedly mounted on chassis 1 for controlling the advance of the head carriage and selecting the direction of tape run. A lever 29 for effecting the advance of the head carriage has an angular shape and is pivotally mounted on a pin 1g depending from the underside of chassis 1. Lever 29 has a forked end 29b which engages with guide pin 24b on head carriage 24 and at the other end is provided with a pin 29a. A control plate 30 having a claw 30a is pivotally mounted on pin 29a. Control plate 30 is biased clockwise by a spring 31 surrounding pin 29a so that plate 30 normally abuts against an upright tab 29c formed on head carriage advancing lever 29. A spring 32 is connected between the other end of head carriage advancing lever 29 and chassis 1 so as to bias lever 29 counterclockwise. Claw 30a of control plate 30 is in engagement with a pin 28a on the rod of selector plunger 28 when head carriage 24 is retracted or in the rest position and lever 29 is placed in position as biased by spring 32. The claw is out of the reciprocating path of pin 28a when head carriage 24 is advanced or in the forward position.

Numeral 33 designates an interlocking lever which is mounted for rotation on a pin 1h on chassis 1 and pivoted at one end to the free end of selector plunger 28 by means of pin 28a. A small swing lever 34 is swingably mounted on a pin 1i on chassis 1 and has a pin 34a secured at one end thereof and depending therefrom to the underside of chassis 1. With head carriage 24 in its rest position, swing lever 34 is kept aligned in a lateral direction due to engagement with upright tabs 24b and 24h of head carriage 24. An elongated T-shaped, large swing lever 35 is disposed below and in parallel with small swing lever 34 and has a longitudinal slot 35a through which pin 34a of swing lever 34 extends. Lever 35 has a pin 35b at one end thereof which is pivotally connected to the other end of interlocking lever 33. Inside both the shoulders of T-shaped lever 35 are formed engaging recesses 35c and 35d. A T-shaped control member 36 is at the center pivotally mounted on a pin 1j on chassis 1. T-shaped member 36 is provided at its base portion with a pin 36a on which a wire spring 37 is wound and secured. The free end of wire spring 37 penetrates through a hole in a wall 36b upstanding from the member and further extends between two projections 34b on swing lever 34. T-shaped member 36 has engaging studs 36c and 36d extending downward below chassis 1. These studs 36c and 36d alternately engage with recesses 35c and 35d of swing lever 35 when head carriage 24 is in the forward position. A torsion spring 38 is connected to one arm of T-shaped control member 36 so that the pivotally movable control member may selectively be held in either of the two positions. Another spring 39 is secured to swing lever 34 and to chassis 1 so that the small swing lever is biased to the left in the drawings.

Figure 5:
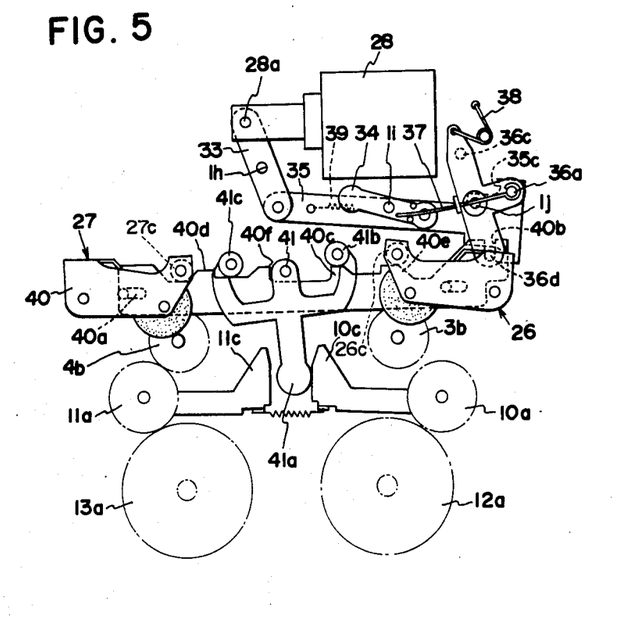
FIGS. 5 and 6 are plan views showing a mechanism for changing the direction of tape run when the head carriage is in the recording/playback position, FIG. 5 being in the forward direction and FIG. 6 being in the reverse direction.
Figure 6:
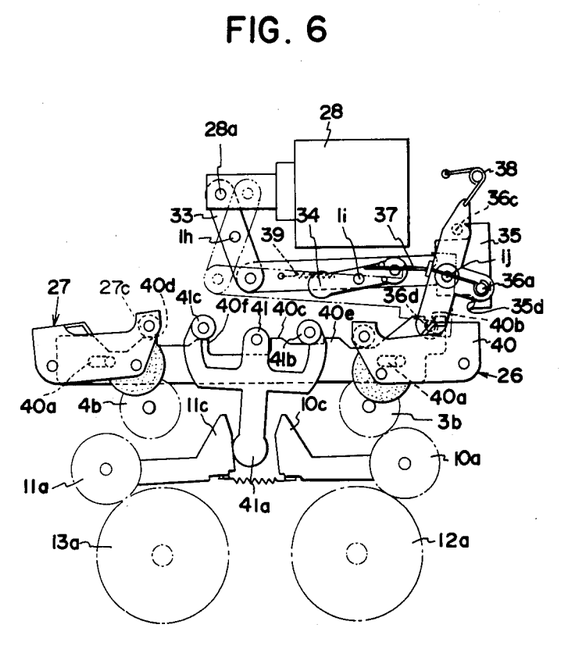

Numeral 40 designates a slide lever which has longitudinal slots 40a adapted to receive pins (not shown) depending from the underside of chassis 1 as best shown in FIGS. 5 and 6. This pin and slot arrangement allows slide lever 40 to move in a lateral direction. Slide lever 40 is provided at one end with an open groove 40b adapted to receive stud 36d depending from T-shaped control member 36. Slide lever 40 is shaped so that it has lands and troughs. Lands 40c and 40d may engage with auxiliary rollers 26c and 27c of the above-mentioned pinch roller units 26 and 27 to control their contact with capstans 3a and 4a, and other lands 40e and 40f may engage with rollers 41b and 41c of a selection arm 41 (to be described hereinafter) to control the pivotal movement thereof. Substantially cross-shaped selection arm 41 includes a center leg pivotally mounted on pin 24b on head carriage 24, a head 41a located between opposing contact portions 10c and 11c of the above-mentioned control levers 10 and 11, and two lateral legs having rollers 41b and 41c.

Figure 7:
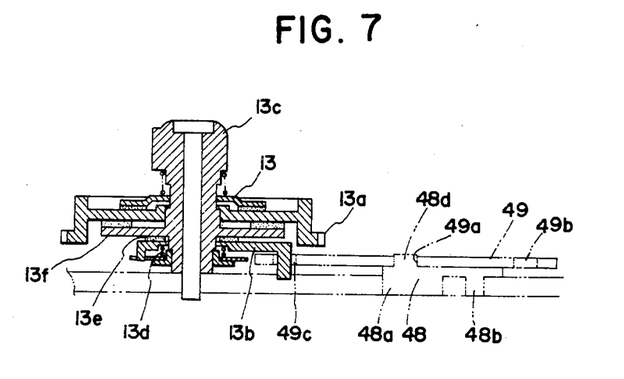
FIG. 7 is a cross-sectional view of a reel base assembly.

Numeral 42 designates a plate for mounting a tape stop detecting unit. Under plate 42 there are pivotally mounted for rotation the above-mentioned pulley 8, a larger gear 43 meshing with a gear 8a formed concentrically with pulley 8, and a cam disc 44 having at the outer periphery a gear 44a meshing with a smaller gear 43a formed integrally with larger gear 43. On the upper surface of cam disc 44 which faces mounting plate 42 there are formed a cam groove 44b defined within an eccentric peripheral wall and at the center a cam 44c having a tooth 44d. A switch 45 for energizing the above-mentioned selector plunger 28 is disposed below mounting plate 42 and an actuating lever 46 is pivotally mounted on plate 42 adjacent switch 45. Lever 46 includes one end facing the contact member of switch 45 to cooperate with it so as to open or close switch 45 and the other end pivotally connected to one end of a cam follower 47. A pin 47a extends perpendicular to cam follower 47. The lower portion of pin 47a is received in cam groove 44b and the upper portion extends through a guide groove 42a in mounting plate 42. A detection arm 48 includes a guide portion 48a received in guide groove 42a with an allowance and also includes a pivot 48b received for rotation in a hole 42b formed in mounting plate 42. Detection arm 48 is forked at 48c so as to engage with pin 47a of cam follower 47. A detection lever 49 is pivotally mounted on arm 48 by inserting a pin 48d (protruding from guide portion 48a) into a hole 49a formed at the center of lever 49. Lever 49 is provided with longitudinal slots 49b and 49c at either end. Through slots 49b and 49c are extended downward protrusions of slip plates 12b and 13b which are disposed below the above-mentioned first and second reel bases 12 and 13. As apparent from FIG. 7, slip plate 13b is mounted on a shaft 13c of reel base 13 by forcing slip plate 13b via a felt pad 13e to a flange 13f of the shaft by means of a spring 13d. Shaft 13c is in slip drive engagement with gear 13a. (Shaft 13c rotates together with driven gear 13a through their frictional engagement. However, when a tape comes to an end, for example, the shaft is stopped and slides over the rotating gear.) Rotation of reel base 13 (including gear 13a and shaft 13b) drives slip plate 13b when no load is applied to the slip plate. However, slip plate 13b stops rotating and slides over rotating flange 13f when any load is applied to the slip plate. The same applies to first reel base 12 and associated slip plate 12b because the structure is the same for both of the first and second reel bases. It should be noted that the tips of the protrusions of slip plates 12b and 13b are received for free movement in openings 42c and 42d in mounting plate 42.

Numeral 50 designates a track change switch adapted to be switched due to pivotal movement of T-shaped control member 36 so as to energize a selected coil of playback head 25. Numeral 51 designates a switch associated with head carriage advancing lever 29. When head carriage 24 is in the forward position, switch 51 is switched by means of lever 29 into a first position wherein motor 2 rotates at a low constant speed. Switch 51 is in a second position wherein motor 2 rotates at a high speed when head carriage 24 is restored.

The entire structure of the tape recorder according to this invention has been described. The operation thereof will now be described.

With no cassette loaded, head carriage 24 is in the rest position and selection arm 41 is in the neutral position so that its head 41a is spaced apart from contact portions 10c and 11c of control levers 10 and 11. That is, neither control portion 10c nor 11c is displaced by head 41a. Accordingly, idle gear 10a meshes with gear 3a of first flywheel 3 and with gear 12a of first reel base 12 while idle gear 11a meshes with gear 4a of second flywheel 4 and with gear 13a of second reel base 13 as shown in FIG. 1.

Figure 8:
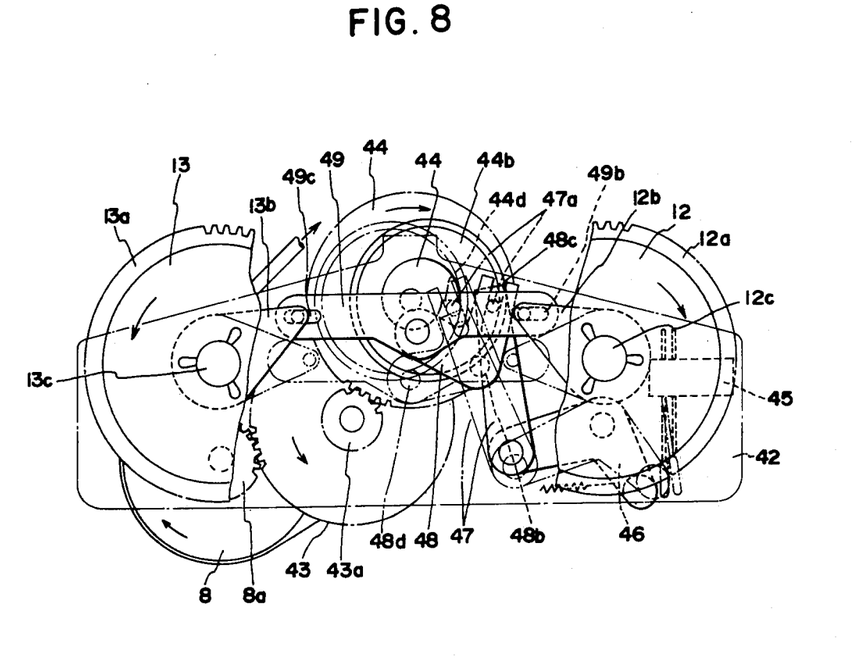
FIGS. 8 and 9 are plan views showing a mechanism for detecting tape stop, FIG. 8 being from tape slack pulling-in to tape stop and FIG. 9 being from normal tape feed to tape stop.

Then a cassette (not shown) is loaded, thereby turning a power switch (not shown) to energize motor 2. Since head carriage 24 is still in the rest position, switch 51 is in the second position so that motor 2 rotates at a high speed in a direction indicated by an arrow in FIG. 2. Therefore, both first and second reel bases 12 and 13 are rotated in opposite take-up directions to pull in the slack of a tape whenever the tape is loose. Rotation of reel bases 12 and 13 drives slip plates 12b and 13b in the same directions to move detection lever 49 upward and in parallel as shown in FIG. 8. As lever 49 is moved, detection arm 48, whose guide portion 48a is moved within guide groove 42a, is rotated about pivot 48b, thereby displacing forked portion 48c clockwise to the right in the drawings. Since forked portion 48c is engaged with the upper end of pin 47a of cam follower 47, this rightward displacement of forked portion 48c causes the lower end of pin 47a to forcedly abut against the peripheral wall of cam groove 44b in cam disc 44. Even though cam disc 44 is being rotated by pulley 8 through the gear train, pin 47a is not engaged by tooth 44d of cam 44c and maintains its abutment against the wall of cam groove 44b.

Figure 9:
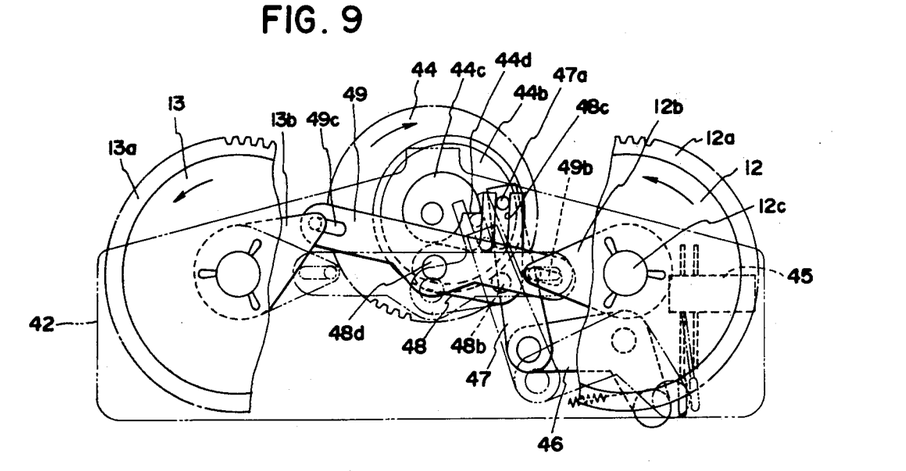

When the slack of a tape has been pulled in, shafts 12c and 13c of reel bases 12 and 13 are prevented from rotating so that the rotational force frictionally applied to slip plates 12b and 13b is eliminated. It should be noted that reel bases 12 and 13, particularly gears 12a and 13a continue rotating or idling because they are mounted for sliding motion on shafts 12c and 13c. Pin 47a is allowed for free movement. Since cam disc 44 is continuously rotated by pulley 8, pin 47a in contact with the wall of eccentric cam groove 44b is guided to a position near the center of the disc and maintained thereat. After reaching the position nearest the center, pin 47a becomes free from the wall of cam groove 44b and follows a circular path containing tooth 44d of cam 44c. Eventually pin 47a is engaged by tooth 44d. Then tooth 44d pushes pin 47a and hence, cam follower 47 as shown in FIG. 9, thereby rotating switch actuating lever 46 counterclockwise to close switch 45. This is shown by dot-and-dash lines in FIG. 9. Selector plunger 28 which is electrically connected to switch 45 is thus energized.

Energization of plunger 28 causes the connecting rod to be retracted and control plate 30 with claw 30a engaged by pin 28a of the rod is also moved to the right, thereby rotating head carriage advancing lever 29 clockwise. Since forked portion 29b of lever 29 is engaged with guide pin 24b on head carriage 24, head carriage 24 is moved forward. Roller 24c provided below the tip of head carriage 24 is brought into locking engagement with jaw 22b of lock plate 22. As a result, head carriage 24 is restrained in the forward position even after selector plunger 28 is de-energized to extend its connecting rod. Clockwise rotation of head carriage advancing lever 29 also causes claw 30a to escape from pin 28a of the plunger and claw 30a is maintained outside the path of pin stroke because control plate 30 is biased against upright tab 29c by spring 31. Therefore, with head carriage 24 in the forward position, claw 30a is prevented from engaging with pin 28a even when plunger 28 is energized again.

When head carriage 24 is moved to the forward position, auxiliary rollers 26c and 27c of pinch roller units 26 and 27 are disengaged from the edges of recesses 24f and 24g in head carriage 24 and the one ends of coil springs 26d and 27d are engaged and urged by upright tabs 24d and 24e on the head carriage. The spring force causes pinch roller units 26 and 27 to pivot toward the respective capstans 3a and 4a.

Figure 10:
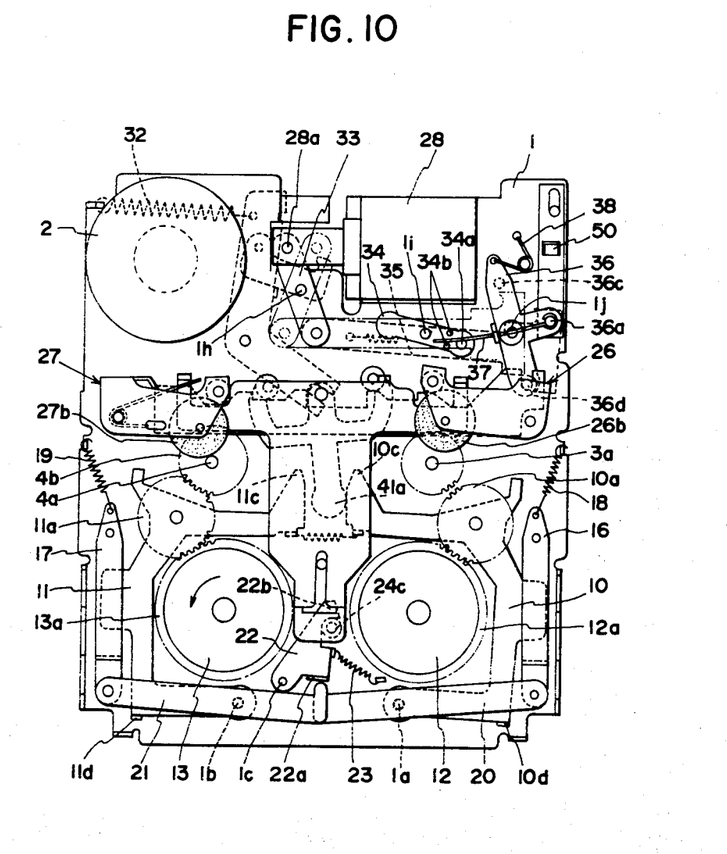
FIG. 10 is a plan view of the tape recorder in a forward playback state.

It is now assumed that slide lever 40 has been moved to the right as shown in FIGS. 5 and 10. Then, auxiliary roller 26c of pinch roller unit 26 abuts against land 40e of slide lever 40, thereby preventing pinch roller unit from further rotating so that pinch roller 26b is kept apart from capstan 3a. Since roller 41b of selector arm 41 also abuts against land 40c of the lever, selector arm 41 is rotated counterclockwise through an angle to bring its head 41a into abutment with contact portion 10c of lever 10, thereby moving contact portion 10c to the right to release idle gear 10a from gear 3b of first flywheel 3.

On the other hand, auxiliary roller 27c of pinch roller unit 27 is disengaged from land 40d of slide lever 40. Therefore, pinch roller unit 27 is allowed to further rotate so that pinch roller 27b is brought into pressure contact with capstan 4e. Since head 41a of selector arm 41 does not abut against the contact portion 11c of control lever 11, the gear train including gear 4b of second flywheel 4, idle gear 11a and gear 13a of second reel base 13 is maintained. Further, head carriage advancing lever 29 changes switch 51 into the first position so that motor 2 rotates at a constant speed.

As a result, head 25 is brought into sliding contact with the tape, second reel base 13 starts rotating in a take-up direction, and the tape is passed in tensioned contact between capstan 4a and pinch roller 27b, starting a playback operation.

The playback operation proceeds until the tape reaches its end.

While the tape is being taken up by second reel base 13, slip plate 13b associated with the second reel base is rotated counterclockwise and slip plate 12b associated with first reel base 12 is also rotated counterclockwise so that detection lever 49 cooperatively connected between slip plates 12b and 13b is rotated clockwise about the projection of slip plate 12b as shown in FIG. 9. Accordingly, detection arm 48 is also rotated clockwise about pin 48b, and pin 47a (guided by forked portion 48c of the arm) is maintained in a position where the lower end of pin 47a is in contact with the peripheral wall of cam groove 44b in cam disc 44 so that pin 47a is free from cam tooth 44d.

Figure 11:
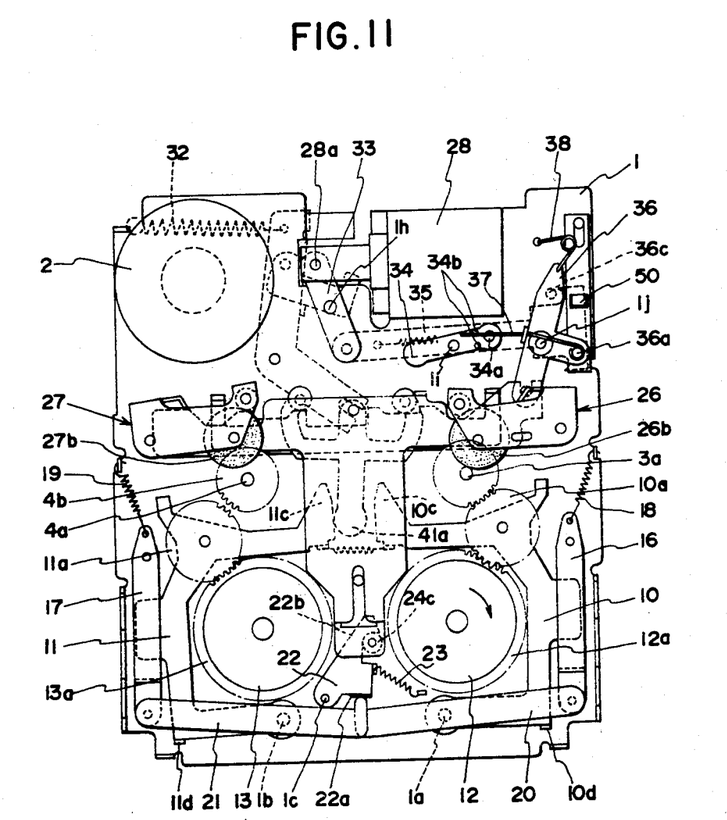
FIG. 11 is a plan view of the tape recorder in a reverse playback state.
Figure 12:
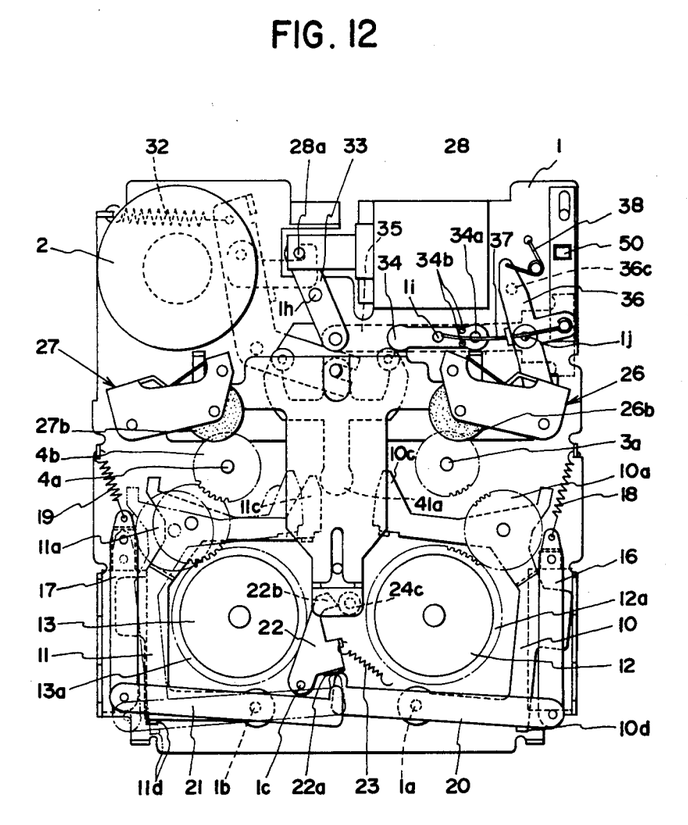
FIG. 12 is a plan view of the tape recorder in a fast forward state.

When the tape stops running, shafts 12c and 13c of first and second reel bases 12 and 13 stop rotating, switch 45 is closed to energize selector plunger 28 as when the shafts stop rotating after the slack of a tape is pulled in. Energization of plunger 28 causes its rod to be retracted to pivotally move interlocking lever 33 clockwise. At this point, since claw 30a of control plate 30 is off the path of stroke of pin 28a with head carriage 24 in the forward position, retraction of the plunger rod has no action on head carriage advancing lever 29. Since slide lever 40 is shifted to the right, control member 36 with pin 36d engaged with groove 40b in the slide lever is pivoted counterclockwise (see FIG. 5). Thus small swing lever 34 is pivoted clockwise by means of wire spring 37. With pin 34a received in slot 35a, large swing lever 35 is also pivoted clockwise and its recess 35d is in engagement with pin 36d of T-shaped control member 36. With this arrangement shown in FIG. 5, the above-described clockwise rotation of interlocking lever 33 causes large swing lever 35 to be pulled to the left to rotate control member 36 clockwise as shown in FIGS. 6 and 11. Slide lever 40 is thus shifted to the left through the engagement of pin 36d in groove 40b, auxiliary roller 27c of pinch roller unit 27 rides over land 40d and roller 41c of selection arm 41 rides over land 40f. Accordingly, pinch roller 27b is separated from capstan 4a and clockwise rotation of selection arm 41 causes its head 41a to abut and push contact portion 11c of control lever 11 to the left, disengaging idle gear 11a from gear 4b of second flywheel 4 so that any rotational force is no longer transmitted to second reel base 13. On the other hand, auxiliary roller 26c of pinch roller unit 26 is disengaged from land 40c to bring pinch roller 26b into pressure contact with capstan 3a. Further, head 41a of selection arm 41 is separated from contact portion 10c of control lever 10 to put idle gear 10a in mesh with gear 3b of first flywheel 3 and with gear 12a of first reel base 12 to complete the gear train. As a result, the tape starts running in the reverse direction. Pivotal movement of control member 36 turns switch 50 into the other position for energizing another channel of head 25, enabling to play back the reverse direction tracks.

In the above-mentioned condition, control member 36 is pivoted clockwise and small swing lever 34 is thus pivoted counterclockwise by means of wire spring 37. Therefore, large swing lever 35 is also pivoted counterclockwise so that its recess 35c is maintained in a position for engagement with pin 36c of control member 36.

If the reverse playback operation comes to an end and selector plunger 28 is energized by detecting the stoppage of tape run with the tape stop detection unit in the same manner as described above, large swing lever 35 acts to rotate control member 36 counterclockwise to pull slide lever 40 to the right, which coincides with the initial state described above. The playback operation is again started in the forward direction.

If it is intended to change playback operation from the forward to the reverse direction midway of the forward playback operation, a suitable re-play button or other suitable means (not shown) is pushed to close switch 45 to energize selector plunger 28. A playback operation in the reverse direction is started in a smaller manner as described with reference to the detection of tape end.

Next, a rewind operation will be initiated midway of the forward playback operation wherein the tape is taken up to the left.

A rewind button (not shown) is pushed to close the associated switch, thereby energizing release plunger 15 to retract its rod. Interlocking lever 17 is moved against the action of spring 19 to pivot release lever 21 counterclockwise about pin 1b. The extension at the other end of lever 21 abuts against upright tab 22a of lock plate 22, thereby rotating lock plate 22 counterclockwise against the action of spring 23. Therefore, jaw 22b is disengaged from roller 24c of head carriage 24 which is moved back by the action of spring 32 through lever 29. Counterclockwise rotation of release lever 21 also causes the release lever to engage upright tab 11d of control lever 11, thereby pivotally moving control lever 11 to separate gear 11a from gear 4b of second flywheel 4 so that second reel base 13 becomes free. Pinch roller 27b is separated from capstan 4a due to engagement of auxiliary roller 27c in recess 24g. On the other hand, head 41a of selection arm 41 which is moved back with head carriage 24 is drawn apart from contact portion 10c of control lever 10. Then control lever 10 is restored to the initial position by the action of spring 11e, re-establishing the gear train including gear 3b of first flywheel 3, idle gear 10a and gear 12a of first reel base 12. Further, as head carriage is moved back, lever 29 acts to turn switch 51 into the second position so that motor 2 rotates at a high speed. Accordingly, first reel base 12 rotates at a high speed to take up the tape.

When this rewind operation comes to an end or the tape runs out, switch 45 is closed to energize selector plunger 28 and de-energize release plunger 15, ensuring that head carriage 24 moves forward to start a playback operation in a similar manner as described with reference to the operation effected after tape end detection. In this case the playback operation is carried out in the same direction as is conducted before the rewind operation, because head carriage 24 in the rest position maintains small swing lever 34 laterally aligned with the aid of upright tabs 24d and 24f and hence large swing lever 35 in parallel therewith so that recesses 35c and 35d engages with neither pin 36c nor 36d of control member 36.

When it is intended to change a rewind operation into a playback operation midway of the rewind operation, a re-play button (not shown) is pushed to disconnect the associated electrical connection to release plunger 15. As a result, interlocking lever 17 is restored by the action of spring 19 and release lever 21 is also restored so that control lever 11 is returned to the initial position.

Idle gear 11a meshes with gear 4b of second flywheel 4 and with gear 13a of second reel base 13 to rotate the second reel base 13 in a direction opposite to the rotating direction of first reel base 12, thereby pulling in the slack of a tape if any. After removal of the slack, head carriage 24 moves forward in the same manner as when loading a cassette, ensuring a playback operation in the same direction as is conducted before the rewind operation.

If it is intended to make a fast forward operation midway of the playback operation, a fast forward button (not shown) is pushed to energize release plunger 14. Detailed explanation may be omitted because the subsequent operations are essentially the same as, but in a mirror image relationship with the case of rewind operation described above.

Next, cassette eject operation is described. An eject lever (not shown) is manually operated to rotate lock plate 22 counterclockwise to release its locking engagement with roller 24c of head carriage 24. Thereafter, the cassette is ejected and the power source is turned off.

Although reference is made to the embodiment wherein a power switch is turned on in response to cassette loading, it may be possible to provide a separate manual power switch.

In the above-described embodiment, selector plunger 28 is energized for playback operation by detecting that reel shafts 12c and 13c stop rotating after the slack of a tape is pulled in by rotating first and second reel bases 12 and 13 in opposite take-up directions. However, it is possible to energize selector plunger 28 at a given time after the cassette loading. The selector plunger may also be energized after measuring or sensing the tension of a tape.

In the above-described embodiment, idle gears 10a and 11a normally mesh with gears 3b and 4b of first and second flywheels 3 and 4 and with gears 12a and 13a of first and second reel bases 12 and 13. However, it is possible to arrange the gears so that they are brought into meshing engagement after a cassette is loaded.

What is claimed is:

1. A mechanism for detecting the stoppage of tape run in a cassette tape recorder including two reel bases with reel shafts, said reel bases being driven by a suitable drive, which comprises
   two slip plates associated with said reel bases so as to be biased upon rotation of the reel shafts,
   a detection lever connected at either end with said slip plates, said lever being displaced upon rotation of at least one reel shaft,
   cam means which does not cooperate with the detection lever when the lever is displaced, but cooperates with the detection lever when the lever is restored as a result of stoppage of the reel shafts, and
   means for interrupting the drive to the reel bases or changing the drive into another state in response to the cooperation of said cam means with said detection lever.

2. A detection mechanism according to claim 1 which further comprises a plate fixedly secured to a chassis for mounting thereon said reel bases, reel shafts, cam means and last-mentioned means.

3. A detection mechanism according to claim 1 wherein said last-mentioned means serves to interrupt rotation of the reel bases or to reverse the rotating direction of a given reel base.

4. A detection mechanism according to claim 1 wherein said cam means comprises
   a detection arm pivotally mounted on said detection lever substantially at the center thereof,
   a rotating cam disc including a cam groove and a cam formed therein, and
   a cam follower having a pin transverse thereto at its extremity,
   said pin of the cam follower being engaged at one end by said detection arm so that the pin is restrained to a given position by way of the detection arm when the detection lever is displaced, and being received at the opposite end in said cam groove so that the rotating cam goes into engagement with the pin to move the cam follower when the detection lever is restored to cancel the restraint of said pin by the detection arm.

5. A detection mechanism according to claim 4 wherein said interrupting means comprises
   an actuator connected to the cam follower, and
   switching means associated with said actuator and drive, wherein when the cam follower is moved, said actuator acts on said switching means to interrupt the drive to the reel bases or to change the drive into another state.

6. A mechanism for detecting the stoppage of tape run in a cassette tape recorder including on a chassis two reel bases driven by a suitable drive and two reel shafts mounted in a slip-drive manner on the reel bases, said reel shafts being normally rotated with the reel bases, but stopped with the reel bases idling when tape run is stopped, said mechanism comprising
   two slip plates associated with said reel shafts so as to be biased upon rotation of the reel shafts,
   a detection lever connected at either end with said slip plates, said detection lever being displaced upon rotation of at least one reel shaft,
   a detection arm pivotally mounted on the detection lever substantially at the center thereof,
   a rotating cam disc including a cam groove and a cam formed therein,
   a cam follower disposed between the detection arm and cam disc and having a pin transverse thereto at its extremity, said pin being engaged at one end by the detection arm so that the pin is restrained to a given position out of cam engagement by way of the detection arm when the detection levers is displaced, and being received at the opposite end in said cam groove so that the rotating cam comes into engagement with the pin to move the cam follower in one direction when the detection lever is restored to cancel the restraint of the pin by the detection arm,
   an actuator connected to said cam follower, and
   switching means associated with said actuator, the actuator acting on said switching means to interrupt the drive to the reel bases or to change the drive into another state when the cam follower is moved in said one direction.

* * * * *